United States Patent
Smith, Jr. et al.

(10) Patent No.: US 8,626,058 B2
(45) Date of Patent: *Jan. 7, 2014

(54) METHOD AND APPARATUS RELATED TO ON-BOARD MESSAGE REPEATING FOR VEHICLE CONSIST COMMUNICATIONS SYSTEM

(75) Inventors: Eugene A. Smith, Jr., Satellite Beach, FL (US); David Michael Peltz, Melbourne, FL (US); Robert C. Palanti, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,724

(22) Filed: Jun. 21, 2012

(65) Prior Publication Data
US 2012/0264370 A1  Oct. 18, 2012

Related U.S. Application Data

(63) Continuation of application No. 12/693,399, filed on Jan. 25, 2010, now Pat. No. 8,229,350, which is a continuation-in-part of application No. 11/088,090, filed on Mar. 23, 2005, now Pat. No. 7,664,459.

(60) Provisional application No. 60/565,591, filed on Apr. 26, 2004.

(51) Int. Cl.
*H04B 3/36* (2006.01)
*H04B 7/14* (2006.01)

(52) U.S. Cl.
USPC ........... 455/7; 455/11.1; 370/315; 246/167 R; 701/20

(58) Field of Classification Search
USPC .......... 455/7, 11.1, 18, 24, 452.2, 513, 67.11, 455/67.13, 114.2, 101, 133–135; 340/298; 701/19, 20; 370/315; 246/166.1–173
See application file for complete search history.

(56) References Cited

U.S. PATENT DOCUMENTS

2004/0207521 A1 * 10/2004 Lumbis et al. ................ 340/514
2005/0148306 A1 *  7/2005 Hiddink ........................ 455/101

* cited by examiner

*Primary Examiner* — Sujatha Sharma
(74) *Attorney, Agent, or Firm* — GE Global Patent Operation; John A. Kramer

(57) ABSTRACT

A communications method for a vehicle consist comprising a lead vehicle having a first and second antenna associated with a respective first and second transceiver and a remote vehicle having a third and fourth antenna associated with a respective third and fourth transceiver. The method further comprises transmitting an outbound message from the first transceiver via the first antenna or from the second transceiver via the second antenna, the outbound message comprising a plurality of message bytes, receiving the outbound message at the third and fourth antennas and associated third and fourth transceivers, determining correct bytes and error bytes in the outbound message as received at the third transceiver, determining correct bytes and error bytes in the outbound message as received at the fourth transceiver, and assembling a reconstructed message using correct bytes from the message received at the third transceiver and the fourth transceiver.

17 Claims, 10 Drawing Sheets

| Unit | Priority Time | Time Delay | Message Content |
|---|---|---|---|
| Lead | --- | --- | Cmd |
| Remote 1 | N x 50 msec | 50 msec | Cmd |
| Remote 2 | N x 50 msec | 100 msec | Cmd |
| Remote 3 | N x 50 msec | 150 msec | Cmd |
| Remote 4 | N x 50 msec | 200 msec | Status (R4) |
| Remote 3 | (M + 1) x 50 msec | 250 msec | Status (R3 + R4) |
| Remote 2 | (M + 2) x 50 msec | 300 msec | Status (R2 + R3 + R4) |
| Remote 1 | (M + 3) x 50 msec | 350 msec | Status (R1 + R2 + R3 + R4) |

N = Remote Number
M = Number of Remotes

*FIG. 5*

| Message Protocol Type | Time to get Command Message to all Remotes | Time to get Status Message from all Remotes Back to Lead |
|---|---|---|
| Normal LOCOTROL Message Protocol | 0.848 sec (0.223 sec) | 2.896 sec (2.271 sec) |
| On-Board Message Repeater Protocol | 1.667 sec (1.042 sec) | 4.377 sec (3.752 sec) |
| Standard Off-Board Message Repeater Protocol | 1.422 sec (0.797 sec) | 4.034 sec (3.409 sec) |

NOTE: All times include 0.625 seconds to allow priority timing from last received End of Message. Actual times based on start of lead transmit are shown in parenthesis.

FIG. 9

METHOD AND APPARATUS RELATED TO ON-BOARD MESSAGE REPEATING FOR VEHICLE CONSIST COMMUNICATIONS SYSTEM

CROSS-REFERENCE TO RELATED APPLICATIONS

This patent application claims priority to and is a continuation of U.S. patent application Ser. No. 12/693,399, filed on Jan. 25, 2010 now U.S. Pat. No. 8,229,350. U.S. patent application Ser. No. 12/693,399 claims priority to and is a continuation-in-part of U.S. patent application Ser. No. 11/088,090, filed on Mar. 23, 2005 (now U.S. Pat. No. 7,664,459), which claims the benefit of the U.S. Provisional Application Ser. No. 60/565,591, filed on Apr. 26, 2004. All of the aforesaid patent applications are incorporated by reference.

BACKGROUND

Distributed power railroad train operation supplies motive power and braking action from a lead locomotive (or lead unit) and one or more remote locomotives (or remote units) spaced apart from the lead unit in a train. In one configuration, a distributed power train comprises a lead locomotive at a head end of the train, a remote locomotive at an end of train (EOT) position and one or more mid-train locomotives disposed between the head end and the end of train. Distributed train operation may be preferable for long train consists to improve train handling and performance, and especially for trains operating over mountainous terrain.

In a distributed power train, each lead and remote locomotive supplies motive power and braking action for the train. Motive and braking command messages are issued by an operator in the lead locomotive and supplied to the remote locomotives over a radio frequency communications system, (such as the prior art LOCOTROL® distributed power communications system, available from the General Electric Company of Schenectady, N.Y.) comprising a radio frequency link (channel) and receiving and transmitting equipment at the lead and the remote units. The receiving remote locomotives respond to these commands to apply tractive effort or braking effort to the train, and advise the lead unit of the receipt and execution of the command. The lead unit also sends other messages to the remote units, including status request messages. The remote units respond by sending a status reply message back to the lead unit.

In a train having two or more directly coupled remote locomotives, the coupled locomotives function in unison via control signals transmitted over their connected MU (multiple unit) lines. One of the locomotives is designated as a controlling remote unit with respect to the distributed power communications system. Only the controlling remote unit is configured to receive commands transmitted by the lead unit and respond to the lead unit with appropriate reply messages.

One of the most critical aspects of train operation is the predictable and successful operation of the air brake system. The air brake system comprises locomotive brakes in each locomotive (including the lead locomotive and all the remote locomotives) and car brakes at each railcar. The lead unit locomotive brakes are controlled by the locomotive operator in response to a position of a locomotive brake handle, and the rail car brakes are controlled in response to a position of an automatic brake handle. The locomotive brakes can also be controlled by the automatic brake handle.

The automatic brake handle or controller controls a pressure in a fluid carrying brake pipe that extends the length of the train and is in fluid communication with a car brake system for applying or releasing car brakes at each railcar in response to a pressure change in the brake pipe. Specifically, a control valve (typically comprising a plurality of valves and interconnecting piping) at each railcar responds to changes in the brake pipe fluid pressure by applying the brakes (in response to a decrease in the brake pipe fluid pressure) or by releasing the brakes (in response to an increase in the brake pipe fluid pressure). The fluid within the brake pipe conventionally comprises pressurized air. Operator control of the automatic brake handle in the lead locomotive initiates a pressure drop at the lead unit that propagates along the brake pipe to the end of the train. The control valve at each railcar senses the pressure drop and in response thereto supplies pressurized air from a local railcar reservoir to wheel brake cylinders that in turn draw brake shoes against railcar wheels. The railcar reservoir is recharged by air withdrawn from the brake pipe during non-braking operational intervals.

A brake release is also commanded by the lead operator by controlling the automatic brake handle to effect a pressure increase in the brake pipe. The pressure increase is sensed at the railcars and in response the brake shoes are released from the railcar wheels.

In a distributed power train, in addition to regulating the brake pipe pressure to effect application and release of the railcar brakes, the lead unit commands remote unit brake applications and releases by sending an appropriate signal to the remote units via the communications channel. As described further below, brake applications and releases are thus more rapidly affected along the length of the train due to the participation of both the lead unit and the remote units. With some limitations as required to maintain train control, in a distributed power train a brake command or brake release can also be commanded by the lead or the remote locomotives.

The railcar brakes can be applied in two modes, i.e., a service brake application or an emergency brake application. In a service brake application, braking forces are applied to the railcar to slow or bring the train to a stop at a forward location along the track. During service brake applications the brake pipe pressure is slowly reduced and the brakes are applied gradually in response thereto. The operator controls the rate at which the pressure is reduced by operation of the automatic brake control handle. A penalty brake application is one form of a service brake application in which the brake pipe is reduced to zero pressure, but the evacuation occurs at a predetermined rate, unlike an emergency brake application as described below, and the railcars do not vent the brake pipe during the penalty brake application.

An emergency brake application commands an immediate application of the railcar brakes through an immediate evacuation or venting of the brake pipe at the lead unit (and the remote units of a distributed power train). When a railcar senses a predetermined pressure reduction rate indicative of an emergency brake application, the railcar also vents the brake pipe to accelerate propagation of brake pipe evacuation along the train. Unfortunately, because the brake pipe runs for several thousand yards through the train, the emergency brake application does not occur instantaneously along the entire length of the brake pipe. Thus the braking forces are not uniformly applied at each railcar to stop the train.

distributed power trains, braking is accomplished by venting the brake pipe at both the lead and remote locomotives, thus accelerating the brake pipe venting and application of the brakes at each railcar, especially for those railcars near the end of the train. As can be appreciated, brake pipe venting at only the lead unit in a conventional train requires propagation of the brake pipe pressure reduction along the length of the train, thus slowing brake applications at railcars distant from the lead unit. For a distributed power train with an operative communications link between the lead and remote units, when the train operator commands a brake application (e.g., a service or an emergency brake application) by operation of the automatic brake control handle at the lead unit, the brake pipe is vented and a brake application command is transmitted to each remote unit over the radio frequency communications link. In response, each remote unit also vents the brake pipe. Thus braking action at the remote locomotives follows the braking action of the lead unit in response to signals transmitted by the communications system.

A brake release initiated at the lead unit is also communicated over the radio frequency link to the remote units so that the brake pipe is recharged to a nominal pressure from all locomotives, reducing the brake pipe recharge time.

If an emergency brake application is initiated at the lead locomotive by the train operator or in response to a detected failure condition, the radio frequency communication system sends an emergency brake signal to each of the remote locomotives over the radio frequency link. In response, the remote locomotives evacuate the brake pipe. This technique permits faster execution of the emergency brake application since the brake pipe is evacuated from all of the locomotives, rather than from only the lead locomotive as in a conventional train.

FIGS. 1 and 2 schematically illustrate an exemplary distributed power train 10, traveling in a direction indicated by an arrowhead 11, wherein one or more remote units 12A-12C are controlled from either a lead unit 14 (FIG. 1) or a control tower 16 (FIG. 2). A locomotive 15 is controlled by the lead unit 14 via an MU line 17 connecting the two units. The teachings of aspects of the present inventive subject matter can be applied to the distributed power train 10 and a communications system operative therewith as described below.

It should be understood that the only difference between the systems of FIGS. 1 and 2 is that the issuance of commands and messages from the lead unit 14 of FIG. 1 is replaced by the control tower 16 of FIG. 2 and certain interlocks of the system of FIG. 1 are eliminated. Typically, the control tower 16 communicates with the lead unit 14, which in turn is linked to the remote units 12A-12C.

In one embodiment, a communications channel of the communications system comprises a single half-duplex communications channel having a three kHz bandwidth, where the messages and commands comprise a serial binary data stream encoded using frequency shift keying modulation on one of four available carrier frequencies. The various bit positions convey information regarding the type of transmission (e.g., message, command, alarm), the substantive message, command or alarm, the address of the receiving unit, the address of the sending unit, conventional start and stop bits and error detection/correction bits. The details of the messages and commands provided by the system and the transmission format of individual messages and commands are discussed in detail in commonly owned U.S. Pat. No. 4,582,280, which is hereby incorporated by reference.

The distributed power train 10 of FIGS. 1 and 2, further comprises a plurality of railcars 20 interposed between the remote units 12A/12B and between the remote unit 12C (of FIG. 1). The arrangement of the locomotives 14 and 12A-12C and railcars 20 illustrated in FIGS. 1 and 2 is merely exemplary, as aspects of the present inventive subject matter can be applied to other locomotive/railcar arrangements. The railcars 20 are provided with an air brake system (not shown in FIGS. 1 and 2) that applies the railcar air brakes in response to a pressure drop in a brake pipe 22, and releases the air brakes upon a pressure rise in the brake pipe 22. The brake pipe 22 runs the length of the train for conveying the air pressure changes specified by the individual air brake controls 24 in the lead unit 14 and the remote units 12A, 12B and 12C.

In certain applications, an off board repeater 26, further described below, is disposed within radio communication distance of the train 10 for relaying communications signals between the lead unit 14 and the remote units 12A, 12B and 12C.

The lead unit 14 and the remote units 12A, 12B and 12C are provided with independent transceivers 28A and 28B operative with respective antennas 29A and 29B for receiving and transmitting communications signals over the communications channel. The off board repeater 26 and the control tower 16 are each provided, with the transceiver 28 operative with the antenna 29 for receiving and transmitting communications signals over the communications channel.

The lead unit transceiver 28 is associated with a lead station 30 for generating and issuing commands and messages from the lead unit 14 to the remote units 12A-12C, and receiving reply messages therefrom.

Commands are generated in the lead station 30 in response to operator control of the motive power and braking controls within the lead unit 14, as described elsewhere herein or automatically as required. Each remote unit 12A-12C and the off board repeater 26 comprises a remote station 32 for processing, repeating and/or responding to transmissions from the lead unit 14 and for issuing reply messages and commands. The lead station 30 and the remote stations 32 are responsive to independent signals from both the transceivers 28A and 28B.

The four primary types of radio transmissions carried by the communications system include: (1) link messages from the lead unit 14 to each of the remote units 12A-12C that "link" the lead unit 14 and the remote units 12A-12C, i.e., configure or set-up the communications system for use by the lead unit 14 and the remote units 12A-12C, (2) link reply messages that indicate reception and execution of the link message, (3) commands from the lead unit 14 that control one or more functions (e.g., application of motive power or braking) of one or more remote units 12A-12C and (4) status and alarm messages transmitted by the one or more remote units 12A-12C that update or provide the lead unit 14 with necessary operating information concerning the one or more remote units 12A-12C.

Each message and command sent from the lead unit 14 is broadcast to all of the remote units 12A-12C and includes a lead unit identifier for use by the remote units 12A-12C for determining that the sending lead unit is the lead unit of the same train. An affirmative determination causes the remote unit 12A-12C to execute the received command.

Messages and alarms sent from one of the remote units 12A-12C also include the sending unit's address. As a result of a previously completed link-up process, the receiving unit, i.e., the lead or another remote locomotive, can determine whether it was an intended recipient of the received transmission by checking the sending unit's identification in the message, and can respond accordingly.

These four message types, including the address information included in each, ensure a secure transmission link that has a low probability of disruption from interfering signals within radio transmission distance of the train 10. The messages allow for control of the remote units 12A-12C from the lead unit 14 and provides remote unit operating information to the lead unit 14.

Although most commands are issued by the lead unit 14 and transmitted to the remote units 12A-12C for execution as described above, there is one situation where a remote 12A-12C issues commands to the other remote units and the lead unit 14. If a remote unit 12A-12C detects a condition that warrants an emergency brake application, the remote transmits an emergency brake command to all other units of the train. The command includes identification of the lead locomotive of the train and will therefore be executed at each remote unit, as if the command had been issued by the lead unit.

Throughout the description of the present inventive subject matter, the terms "radio link", "RF link" and "RF communications" and similar terms describe a method of communicating between two links in a network. It should be understood that the communications link between nodes (locomotives) in a system in accordance with the present inventive subject matter is not limited to radio or RF systems or the like and is meant to cover all techniques by which messages may be delivered from one node to another or to plural others, including without limitation, magnetic systems, acoustic systems, and optical systems. Likewise, a system of the present inventive subject matter is described in connection with an embodiment in which radio (RF) links are used between nodes and in which the various components are compatible with such links; however, this description of the presently preferred embodiment is not intended to limit the inventive subject matter to that particular embodiment.

In a distributed power train, responsive to an operator-initiated command, the communications system at the lead unit transmits to each remote unit a radio frequency (RF) message representing the command. Such commands can include locomotive throttle or traction commands and air brake, dynamic brake and electric brake commands. In the case of an air brake command, upon message receipt, the brake command is executed at each remote unit to accelerate command response at the railcars, since the remote units receive the radio frequency message before they sense the brake pipe pressure change. For example, if the operator commands a brake application, the brake pipe is vented at the lead unit and the pressure reduction propagates along the length of the train until reaching the end-of-train car. Depending on train length, several seconds may elapse before the pressure reduction reaches the last railcar. Venting the brake pipe at the lead and remote locomotives, the latter in response to the RF message, accelerates the brake pipe venting and application of the brakes at each railcar, especially for the railcars near the end of the train. Thus braking actions at the remote locomotives follow the braking actions of the lead unit in response to the RF signals transmitted by the communications system.

A brake release initiated at the lead unit is also communicated over the radio frequency link to the remote units so that the brake pipe is recharged to its nominal pressure from all locomotives, reducing brake pipe recharge time.

If the train operator initiates an emergency brake application at the lead locomotive, the communication system sends an emergency brake signal to each of the remote locomotives over the radio frequency link. The remote locomotives evacuate the brake pipe to provide faster execution of the emergency brake application since the brake pipe is evacuated from all of the locomotives, rather than from only the lead locomotive as in a conventional train.

In general, messages sent over the communications system permit the application of more even tractive forces to the railcars and improve braking performance as each locomotive can effect a brake application at the speed of the RF signal, rather than the slower speed at which the pneumatic brake pipe braking signal propagates along the train.

When the distributed power train is operating in an environment where each remote unit is expected to receive command messages sent by the lead unit, for example when the train is traveling along a relatively straight length of track with no proximate obstructions to a radio frequency signal, the communications system is operative in a normal mode. In this mode, no communications losses, interruptions or repeated messages (because the message did not reach its intended destination when first transmitted) are anticipated. Most messages issued in the normal mode are controlled according to a fixed priority message protocol, according to which each remote unit transmits a status message responsive to a lead-issued command message after a predetermined interval from transmission of the command. Thus each remote unit is assigned a time slot, measured from transmission of the lead unit command message, during which each remote unit transmits its message.

A timing diagram of FIG. 3, where the system is described for a railroad train comprising a lead unit and four remote units, illustrates the concepts associated with the fixed priority message protocol for normal communications. The concepts described in conjunction with FIG. 3 can be applied to a train comprising more or fewer than four remote locomotives.

According to this scheme, at a time t=650 msec, the lead unit transmits a command message (for example, a brake command, a traction command, a dynamic brake command, etc.) that is expected to be received by all remote locomotives in the distributed power train. As can be seen in FIG. 3, each transceiver (also referred to as a radio) is allocated a 30 msec interval to turn on, and an exemplary command message length is 193 msec. After a lapse of the predefined interval from the lead transmission, for example 50 msec as indicated in FIG. 3, a first remote locomotive retransmits the command message and its status message (for example, the first remote locomotive is venting the brake pipe in response to the brake command). The status message is intended for the lead locomotive so that the train operator is advised of the first remote unit's response to the command. Also note that each remote unit retransmits the command message with its status message to maximize the likelihood that the command is received by all remote locomotives. The turn-on time, message duration, etc. illustrated in FIG. 3 are merely exemplary and can vary depending on the application and specifications of the components that comprise the communications system.

The second remote locomotive repeats the command message and transmits its status message after a predetermined delay, for example 50 msec, from the end of the first remote's transmission. The command repeating and status transmitting process continues until all remote locomotives have repeated the command message and transmitted their respective status message. An end of message condition occurs when the last remote has transmitted its status, after which the lead unit is free to transmit another command message to the remote locomotives. In the FIG. 3 embodiment, the end of message occurs at t=2896 msec or 2271 msec after the lead unit's initial transmission.

When the lead unit transmits a command message, the lead unit will not know whether the message was received by all the remote units in the train until a remote status message is received from each remote unit (wherein the status messages indicates receipt and execution of the command message) or a status message is not received from one or more of the remote units (lack of a status message indicates the command message was not received). Thus according to one embodiment of the communications system, to ensure that each remote unit receives the command messages, it is repeated by each remote unit.

Note that it is possible that one or more remote status messages may not be received by the lead unit. When this is the case, the lead unit retransmits the command message and awaits a reply status message from each remote unit in the train. One feature of the present inventive subject matter, to be described below, increases the likelihood that all status messages are received at the lead unit, thus reducing the retransmit probability, without significantly impacting the overall transmission timing for the command and status messages.

In addition to the fixed priority protocol described above, certain commands, e.g., an emergency brake application, are classified as high priority command messages and are transmitted according to a different priority protocol than the fixed priority protocol. Still other command messages, e.g., a communications system check, operate according to other priority protocols that control transmission of these commands and the reply by the remote units.

As the distributed power train passes through certain terrain topographies or track segments with proximate natural or man-made obstructions, a line-of-sight communications link between the sending and the receiving units may be interrupted. Thus commands and status messages may not be reliably received by the receiving unit, i.e., the lead locomotive for messages sent from a remote unit, and a remote locomotive for messages sent from the lead unit. Although high-power, robust transceivers may be capable of successfully transmitting the signal to the receiving unit under certain operating conditions, such equipment can be relatively expensive. Further, in some operating scenarios even a high-power transceiver cannot successfully effect communications, such as when a long train travels a curved track segment adjacent a natural obstruction such as a mountain, where the communications path between the lead unit and one or more remote units is obstructed by the mountain. Also, as the train passes through a tunnel certain transceivers may be unable to communicate with other transceivers aboard the locomotives.

To improve system reliability, one embodiment of the distributed power train communications system comprises the off-board repeater 26 (see FIG. 1) for receiving messages sent from the lead unit 14 and repeating (retransmitting) the message for receiving by the remote units 12A-12C. This embodiment may be practiced along a length of track that passes through a tunnel, for example. In such an embodiment the off-board repeater 26 comprises an antenna 29 (e.g., leaky coaxial cable mounted along the tunnel length) and the remote station 32 for receiving and retransmitting lead messages that are received by all the remote units 12A-12C within RF communications range of the repeater antenna 29.

BRIEF DESCRIPTION

According to one embodiment, a communications method is provided for a vehicle consist comprising a lead powered vehicle having a first antenna associated with a first transceiver and a second antenna associated with a second transceiver and a remote powered vehicle having a third antenna associated with a third transceiver and a fourth antenna associated with a fourth transceiver. The method comprises transmitting an outbound message from the first transceiver via the first antenna or from the second transceiver via the second antenna, the outbound message comprising a plurality of message bytes. The method also comprises receiving the outbound message at the third and the fourth antennas and the associated third and fourth transceivers. Also, the method comprises determining correct bytes and error bytes in the outbound message as received at the third transceiver, determining correct bytes and error bytes in the outbound message as received at the fourth transceiver, and assembling a reconstructed message using correct bytes from one of the message received at the third transceiver and the message received at the fourth transceiver.

According to another embodiment, a communications method is provided for a vehicle consist comprising a lead powered vehicle and a plurality of remote powered vehicles. The method comprises transmitting an outbound message from the lead powered vehicle, the outbound message comprising a plurality of message bytes, one or more of the plurality of remote powered vehicles receiving and retransmitting the outbound message. The method also comprises receiving a first occurrence of the outbound message at a one of the plurality of remote powered vehicles, receiving a second occurrence of the outbound message at the one of the plurality of remote powered vehicles, determining correct bytes and error bytes in the first occurrence of the outbound message, determining correct bytes and error bytes in the second occurrence of the outbound message, and assembling a reconstructed outbound message at the one of the plurality of remote powered vehicles using correct bytes from the first or the second occurrence of the outbound message.

BRIEF DESCRIPTION OF THE DRAWINGS

The present inventive subject matter can be more easily understood and the further advantages and uses thereof more readily apparent, when considered in view of the following detailed description when read in conjunction with the following figures, wherein:

FIG. 5 is a table illustrating timing parameters for the onboard message priority protocol according to the teachings of the present inventive subject matter.

FIG. 9 is a table illustrating timing parameter comparisons for the normal priority message protocol, the onboard repeater message priority protocol and the off-board repeater message priority protocol.

In accordance with common practice, the various described features are not drawn to scale, but are drawn to emphasize specific features relevant to the inventive subject matter. Reference characters denote like elements throughout the figures and text.

DETAILED DESCRIPTION

Figure 1:
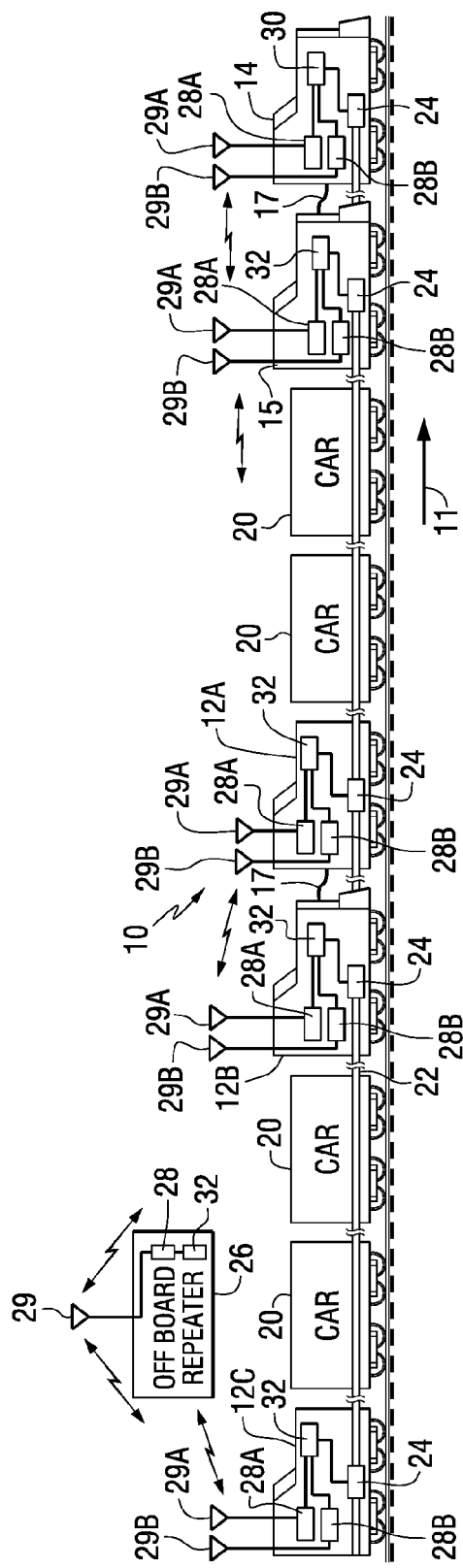
FIGS. 1 and 2 are schematic illustrations of a distributed power train to which the teachings of the present inventive subject matter can be applied.
Figure 2:
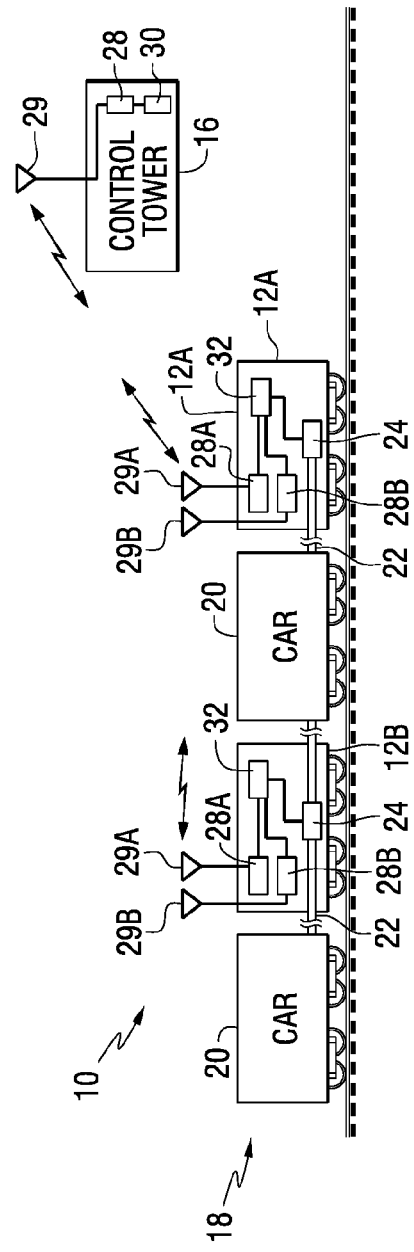

Before describing in detail the particular method and apparatus for a priority message protocol for an on-board message repeater system in accordance with the present inventive subject matter, it should be observed that aspects of the present inventive subject matter reside primarily in a novel combination of hardware and software elements related to said method and apparatus. Accordingly, the hardware and software elements have been represented by conventional elements in the drawings, showing only those specific details that are pertinent to aspects of the present inventive subject matter, so as not to obscure the disclosure with structural details that will be readily apparent to one of ordinary skill in the art having the benefit of the description herein.

According to a preferred embodiment comprising a priority message protocol for an on-board message repeater system in a distributed power train, such as the distributed power train 10 of FIG. 1, messages transmitted from the lead unit 14 leapfrog down the train from the head end to the end-of-train as each successive remote unit 12A-12C receives and retransmits the message.

Figure 3:
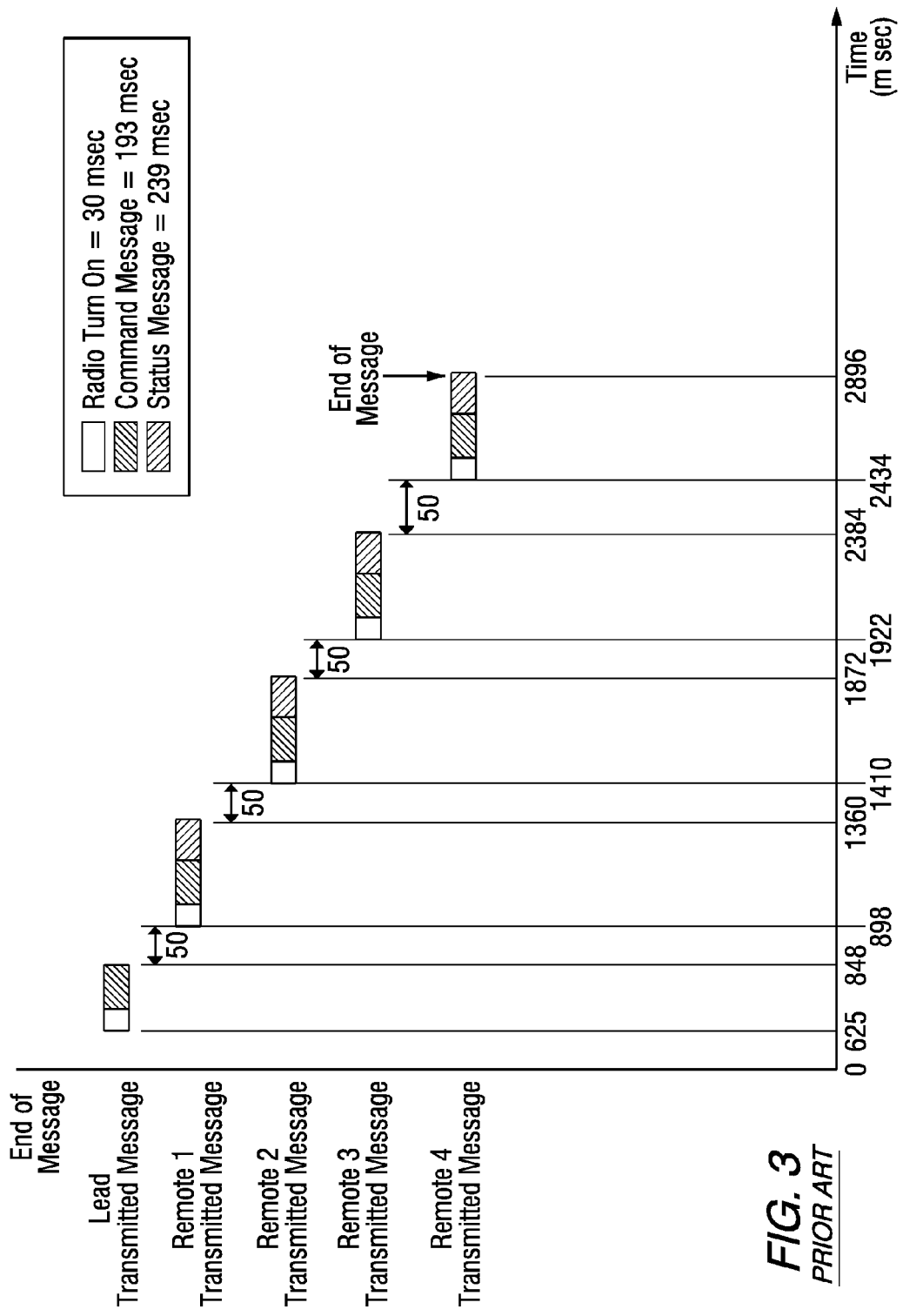
FIG. 3 is a timing diagram of a prior art normal message priority protocol for a communications system.

Further, when the train enters an environment where the lead locomotive unit may not successfully communicate directly with each remote unit (for example, when the train enters a tunnel), the communications system may automatically switch to the priority protocol for on-board message repeating (OBMAR) according to the teachings of the present inventive subject matter. Such a switch occurs, for example, when the communications system experiences an interrupt of more than a predetermined fixed duration, one minute for example. Once activated, in one embodiment the OBMR protocol is active for fifteen minutes, after which the communications system returns to normal priority message protocol operation, i.e., as described in conjunction with FIG. 3. In another embodiment, the communications system can be configured for continual OBMR operation or OBMR operation can be manually activated by the lead locomotive operator.

Figure 4:
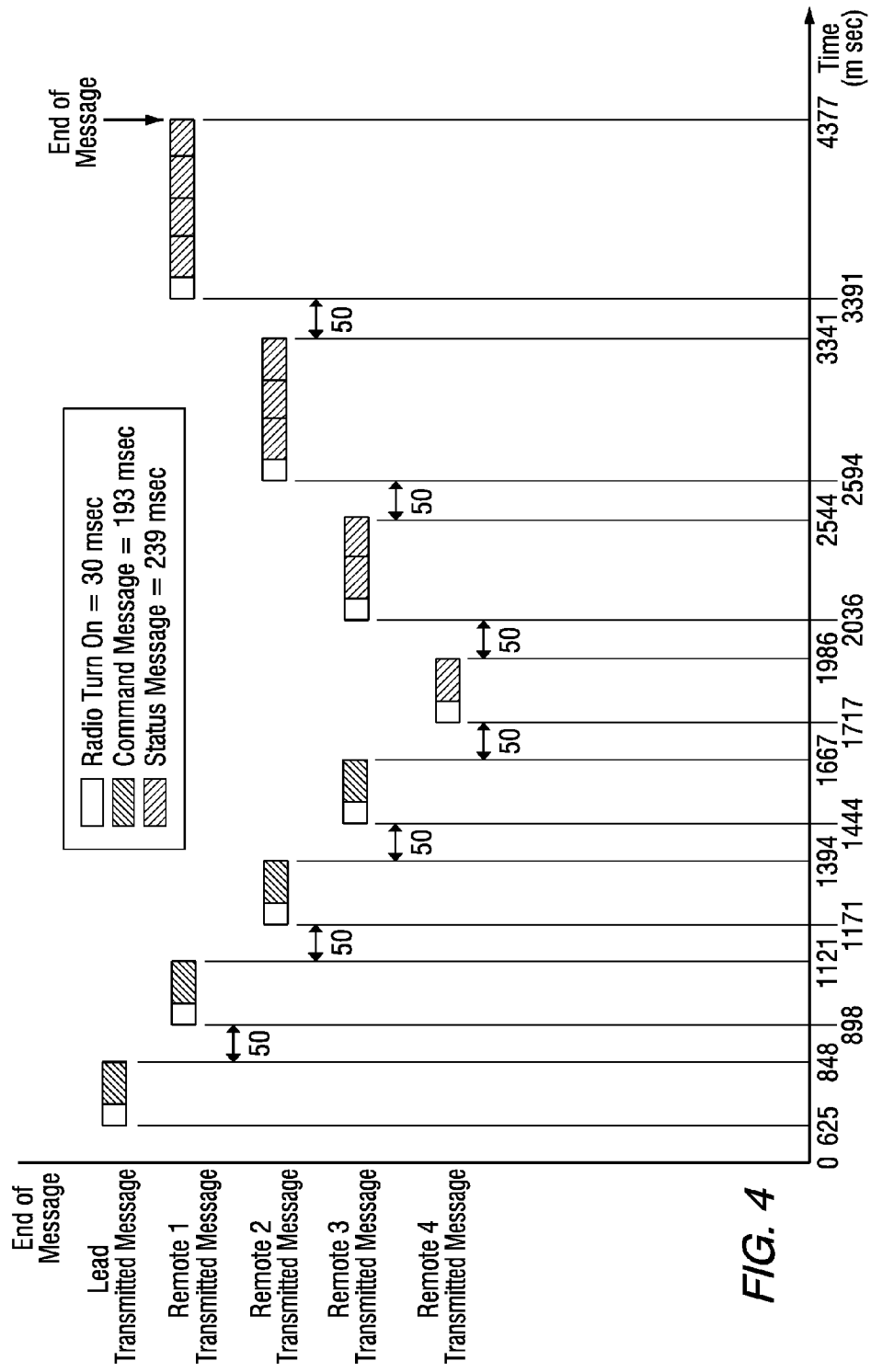
FIG. 4 is a timing diagram of an onboard message priority protocol, according to the teachings of the present inventive subject matter, for use with a train comprising four remote units.

FIG. 4 illustrates an exemplary OBMR protocol for a train comprising a lead unit and four remote units. In this mode, the lead unit transmits a command message (i.e., a message that commands a new function at the remote units or a status update message that requests remote unit status information and also includes the most recent previously-transmitted command). The first remote unit receives the outbound command message and repeats the message for receiving by other remote units in the train.

As illustrated in FIG. 4, the lead unit transmission begins at 625 msec after a time t=0. This interval is merely exemplary and represents a predetermined minimum interval between receipt of a message at the lead unit and a transmission of a later command from the lead unit. Note the exemplary 50 msec delay interval between the end of a message transmission and retransmission of the message, and also the allotted exemplary 30 msec radio (transceiver) turn-on time. Generally, the command messages sent by the lead unit, the messages sent by the remote units and the interval between message transmissions are fixed in length. However, these lengths may vary as needed for a particular application of the present inventive subject matter and may differ among different railroad operators.

Unlike the normal communications mode described above, according to one embodiment of the inventive subject matter the first remote does not transmit a return status message upon receipt of the outbound message that was sent from then lead locomotive. Instead, the first remote unit (and each subsequent remote unit) repeats the outbound message, thereby permitting the outbound message to propagate along the length of the train, without incurring the time penalty of the inbound (i.e., in a direction toward the lead locomotive) status messages transmissions from each remote unit. As can be seen from FIG. 4, each remote unit retransmits the outbound message within its respective predefined time slot, a predetermined time interval after receiving the outbound message, after another remote unit has transmitted the transmitted the outbound message, or after another remote unit has transmitted a response. Thus the message leapfrogs down the train for receiving by each remote unit. When the outbound message is retransmitted by the last remote, no status messages have been returned to the lead locomotive.

One premise of certain embodiments of the inventive subject matter is that each locomotive of the train receives (e.g., "hears") messages sent from the lead locomotive and from the remote locomotive(s), although this may not always be true due to interference, low signal strength, etc. The signal timing parameters and actions at the lead and remote units as described herein are based on this premise. If a remote unit fails to receive a lead message, for example, this situation is discovered when the lead unit fails to receive a response from that remote locomotive. The lead locomotive takes corrective action, including retransmitting the original message.

Also, it can be seen from FIG. 4 that each remote locomotive waits a predetermined time from receiving the message (either from receiving the outbound message or from receiving the inbound message) from the lead locomotive or from a prior remote locomotive, where "prior" refers to a locomotive that received the message earlier in time and transmits a response message or retransmits the received message. However, if the prior remote locomotive did not receive the message, it obviously cannot transmit a response message or retransmit the original message. Under these circumstances a remote locomotive expecting a response from the prior locomotive will not receive that response. The remote locomotive expecting the response will therefore wait a predetermined time from receipt of the last message until sending its own message or retransmitting the original message.

When setting up the communications system as described above, each locomotive is configured to reflect its position in the train. Thus each message sent by a locomotive includes an identifier of the transmitting locomotive. Each locomotive receiving the message can therefore determine the locomotive that transmitted the message and can also determine the position of the transmitting locomotive in the train relative to the position of the receiving locomotive.

When the last remote (the nth remote) receives the command message, the last remote sends its status message (i.e., an inbound, message) back to the previous (n−1)th remote. According to standard practice, when the communications system is configured or the lead and remote units are linked, the remote unit farthest from the lead unit is configured as the last remote, i.e., the last remote "knows" that it is the last remote in the train. Thus when the last remote unit receives the outbound message it responds with its status message. Remote unit three (in the case where n=4) receives the status message from remote unit four and stores the received status message until its designated time slot, at which time remote unit three repeats the remote unit four status message and appends its own status message, transmitting both status messages in a direction of the lead unit, i.e., to the second remote. Remote unit two receives the status messages from remote units four and three, and transmits these status messages, plus its own status message, in the direction of the lead unit. The process continues until each remote unit's status message reaches the lead unit as a concatenated message comprising the status message from each remote unit.

As can be seen from FIG. 4, this occurs at t=4377 msec, or a total elapsed time of 3752 msec from the start of transmission of the outbound command message to receipt of all status messages at the lead unit.

According to standard operation procedure of the distributed power train communications system, in the event that a remote unit did not receive the outbound message as it was originally transmitted from the lead unit or as the message was successively repeated by the remote units, a non-receiving remote unit will not have a status message to report back to the lead unit. The lead unit expects a status message from each of the remote units and can determine from the received status messages (each remote unit status message includes a remote unit identifier) which if any of the remote units did not receive the command message. Thus if the lead unit does not receive a status message from one or more remotes, the command is retransmitted by the lead unit. According to one embodiment, the lead operator is informed of this remote unit miss by an appropriate indication on a lead unit display.

As can be appreciated by one of ordinary skill in the art, a status message transmitted by a remote unit may be received by remote units in addition to the intended receiving remote unit, i.e., where the intended receiving remote unit is that remote unit adjacent to the transmitting remote unit in a direction toward the lead unit of the train. For example, in the FIG. 4 distributed power train having four remote units, both remote units two and three may receive the status message transmitted by the remote unit four. Remote unit two stores the remote four status message until its designated transmitting time slot or until a designated time interval from receipt of the message from the last remote to transmit the message. Thus remote unit two may receive the remote four status message twice: (1) when initially transmitted by the remote unit four, and (2) when retransmitted by remote unit three. The capability of multiple receptions of a status message improves the probability that the lead unit receives the status message from each remote unit that received the command message.

In one embodiment, a remote unit receiving the message twice, as described immediately above, compares the two messages, byte by byte. Each byte of the message includes an error detection code (for example, a parity check), thus permitting a determination that each byte is error-free (the parity check indicated that no errors had occurred) or contains errors (the parity check indicated that at least one error occurred). If a byte in a first message failed the parity check and the same byte in a second message passed the parity check, then the failed byte in the first message is replaced by the correct byte from the second message.

In another embodiment, a message is received at both antennas 29A and 29B and processed through associated transceivers 28A and 28B of any of the remote locomotives 15, 12A, 12B and 12C and the lead locomotive 14. See FIG. 1. Both messages are the processed through the lead station 30 or the remote station 32, as appropriate, where the two messages are compared byte by byte. Each byte of each message includes an error detection code (for example, a parity check), thus permitting a determination that a byte is error-free (the parity check indicating that no errors were present) or a byte contains at least one error (the parity check indicating that at least one error is present). If a byte in a first message failed the parity check and the same byte in a second message passed the parity check, then the failed byte in the first message is replaced by the correct byte from the second message to assemble a corrected message. The corrected message is then processed through the associated lead station 30 or the remote station 32.

FIG. 5 is a table indicating the relative transmission order, delay time, and message content for the message priority protocol for on-board message repeating for a train comprising one lead locomotive and four remote locomotives as illustrated in FIG. 4. However, when a remote unit transmits, the time delay period from the third column of FIG. 5 for each later-transmitting remote is decremented as explained below.

The time delay between the end of a transmission from one unit and the beginning of a transmission from another unit is 50 msec in the illustrated embodiment. As each remote unit transmits, the time delay for each subsequent remote to transmit is reduced by 50 msec thus allowing each remote unit to transmit in order while maintaining 50 msec between each unit's transmission. If a remote unit does not transmit after its defined time delay then each subsequent remote recognizes this and adjusts its own time delay accordingly when a subsequent unit's transmission is received.

For example, if remote unit one does not transmit, remote unit two waits 100 msec from the end of the lead unit transmission before it transmits. If remote unit two transmits, then each subsequently transmitting remote unit recognizes that two remotes should have transmitted in this time frame and subtracts 100 msec from its time delay; remote unit three transmits 50 msec (150–100 msec) after the end of the remote unit two transmission, with remote four transmit delay adjusted to 100 msec (200–100 msec) after the end of the remote unit two transmission, etc.

But if remote unit two does not transmit (and remote unit one did not transmit) then remote unit three is set to transmit 150 msec after the end of the lead unit transmission and when remote unit three transmits each subsequently transmitting remote unit recognizes that three remote units should have transmitted in this time frame and each subtracts 150 msec from its time delay.

Finally, if the remote units one, two and three do not transmit, then remote unit four waits 200 msec from the end of the lead unit transmission to transmit and when remote four transmits each subsequently transmitting remote unit will recognize that four remote units should have transmitted in this time frame and each therefore subtracts 200 msec from its time delay.

In another example, if the lead unit and the first remote unit transmit, then the second remote unit transmits at 100–50=50 msec from the end of the first remote transmission. The third and fourth remote units also subtract 50 msec from their delay period and they are set to transmit at 100 msec and 150 msec, respectively, from the end of the first remote transmission if remote unit two does not transmit.

When the second remote units transmits 50 msec after the end of the first remote transmission, then all subsequent remotes subtract 50 msec from their previously adjusted time delay (i.e., the previous adjustment of subtracting 50 msec due to the transmission of remote unit one) and the third remote unit transmits at 100–50=50 msec. from the end of the second remote transmission. The fourth remote unit also subtract 50 msec from its previously adjusted delay and is set to transmit at 150–50 msec=100 msec, from the end of the second remote transmission if remote unit three does not transmit. When the third remote units transmits 50 msec after the end of the second remote transmission, then all subsequent remotes again subtract 50 msec from their previously adjusted time delay and the fourth remote unit transmits at 100−50=50 msec from the end of the third remote transmission.

Generally, as each remote unit transmits and the message is received by all other remote units, then each remote unit that has not yet transmitted the message subtracts 50 msec from its assigned time delay period. This shortening of the time delay period reduces the time required for the message to leap frog up and down the train.

Consider a scenario where one or more remote units do not transmit. For example assume the lead unit transmits a command message and 50 msec after the command message ends remote unit one transmits the command message. At this point each remote unit has heard the transmission from remote unit one and therefore has subtracted 50 msec from its assigned time delay. Assume further that remote unit two did not transmit 50 msec after remote unit one ended its transmission. Remote unit three has therefore reduced its time delay to 150−50=100 msec, where the 50 msec reduction is due to the transmission by remote unit one. Remote unit three will transmit 100 msec after the end of the last transmission, which in this case is the transmission from remote unit one.

Assume instead that remote unit one did not transmit the message from the lead unit and remote unit two did not transmit the message. Remote unit three therefor transmits at 150 msec from the end of the lead unit transmission. Remote unit four subtracts 150 msec (due to recognizing that remote 1, 2 and 3 should have transmitted in this time frame) from its assigned time delay; 200−150=50 msec. Remote unit four will transmit 50 msec after the end of the remote unit three transmission.

As can be seen, the 50 msec interval is a sliding interval, such that whenever a remote unit transmits a signal, the next remote waits 50 msec from the end of the transmission before initiating its transmission. If a remote unit does not transmit a signal then the subsequent remote units wait their assigned time delay period less 50 msec for each remote unit that transmitted or should have transmitted the signal.

Figure 6:
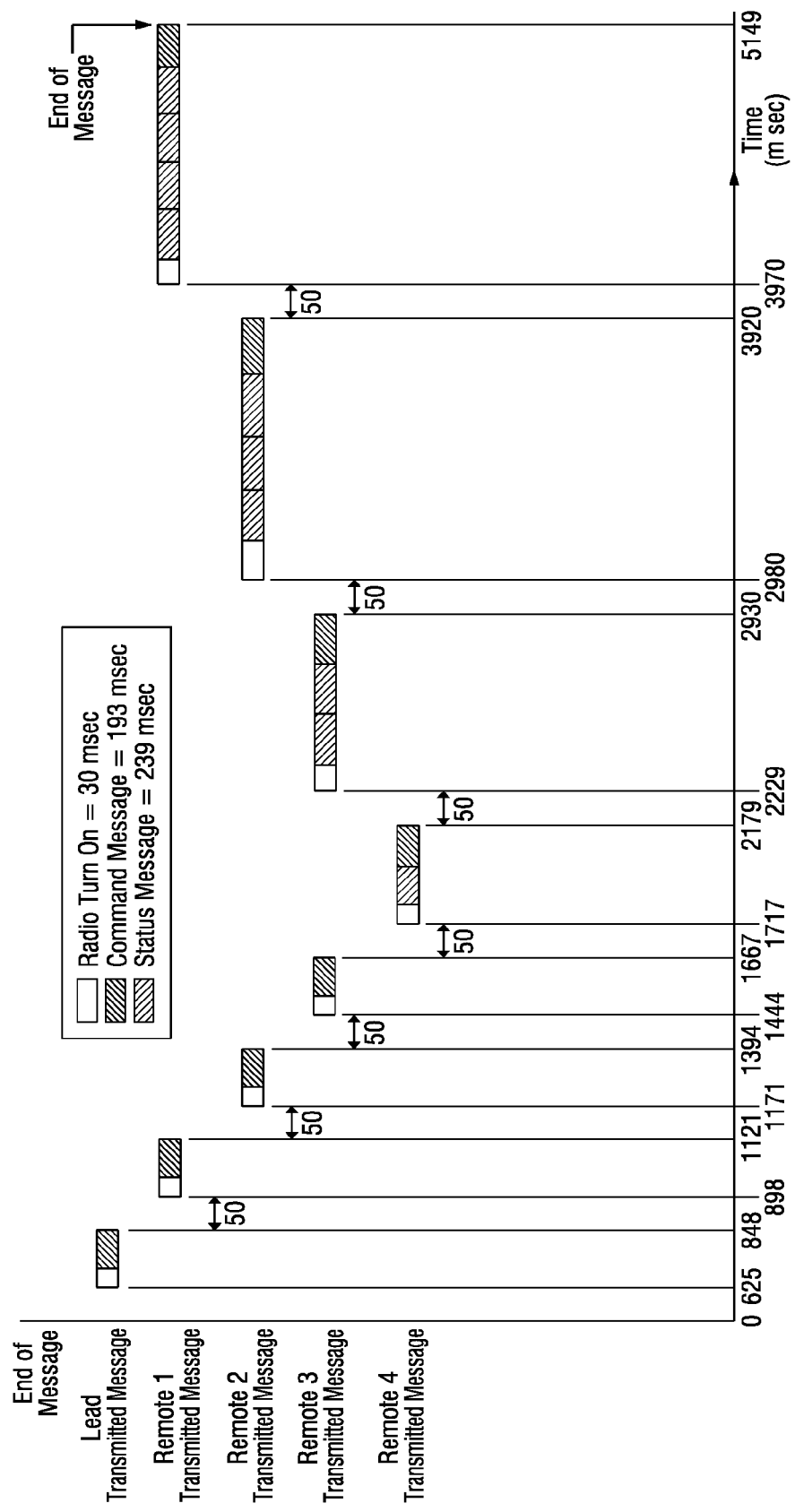
FIG. 6 is a timing diagram of another embodiment of an onboard message priority protocol, according to the teachings of the inventive subject matter, for use with a train comprising four remote units.

According to a variant of the OBMR protocol described in conjunction with FIGS. 4 and 5, during the period when status messages are transmitted by the remote units in the direction of the lead unit, the outbound command message is also transmitted by the remote units to maximize the opportunity for each remote unit to receive the command message. This scenario, which is illustrated in FIG. 6, extends the time between transmission of the command message from the lead unit and receipt of the remote status messages at the lead unit, with the benefit of increasing the probability that each remote unit receives the outbound message.

Figure 7:
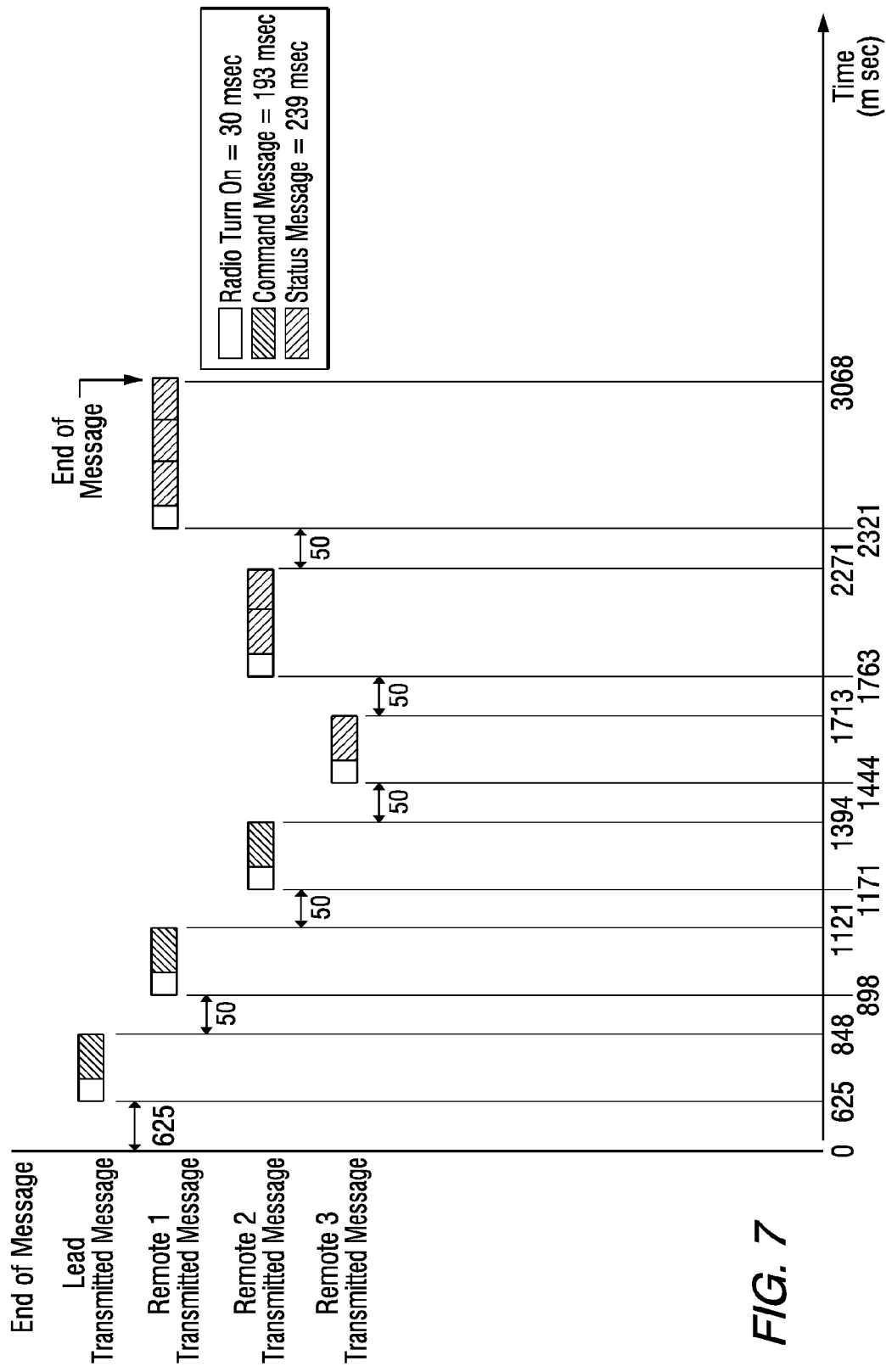
FIG. 7 is a timing diagram of an onboard message priority protocol, according to the teachings of the present inventive subject matter, for use with a train comprising three remote units.

FIG. 7 is a timing diagram for the message priority protocol for on-board message repeater for a train comprising a lead locomotive and three remote locomotives. The implementation principles for a distributed power train comprising three remote units are identical to the implementation for a four remote unit distributed power train as described above in conjunction with FIG. 4. As can be appreciated by one of ordinary skill in the art, the embodiment illustrated in FIG. 6 wherein the remote units retransmit the command message can also be applied to a train comprising a lead unit and three remote locomotives (or a train comprising any number of remote units).

Figure 8:
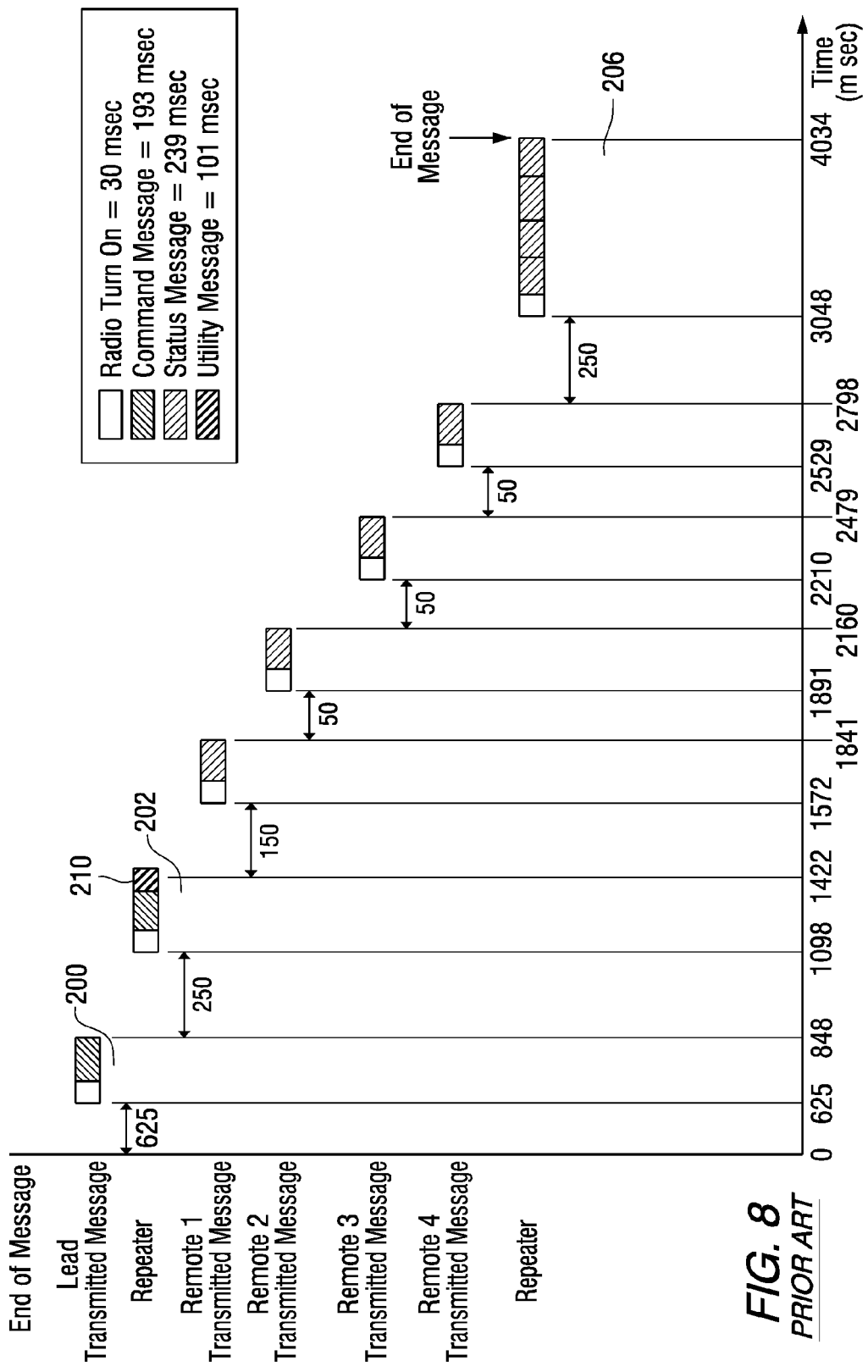
FIG. 8 is a timing diagram for an off-board message repeater system according to the teachings of the present inventive subject matter.

FIG. 8 is a timing diagram for the normal communications timing protocol when operative with the off-board message repeater 26 described above in conjunction with FIG. 1. The lead unit transmits a command message during time interval 200 that is received and retransmitted by the message repeater 26 during time interval 202. Each of four remote units receives the repeated command message and responds with its status message during its allotted time slot. The repeater 26 receives all the remote unit status messages and retransmits them for receiving by the lead unit 14 during time interval 206, after which the message interval ends.

A utility message 210 referenced in FIG. 8 is a message sent by the repeater 26 to all lead units in radio range of the repeater 26, causing all receiving lead units to delay transmissions. For example, the utility message prevents a lead unit that is outside of a tunnel from transmitting simultaneously with a remote unit that is inside the tunnel.

FIG. 9 compares message delay times of the prior art normal message protocol, the OBMR protocol of embodiments of the present inventive subject matter, and the normal message timing protocol when operative with the off-board message repeater.

In other embodiments, a communications system inventive subject matter further comprises an antenna/radio diversity feature and/or a signal selection feature that are advantageous to overcome signal transmission path impairments such as caused by multi-path signal propagation, signal reflections and signal obstructions (such as due to a locomotive-mounted pantograph for supplying electrical power to the locomotive from overhead power cables).

Figure 10:
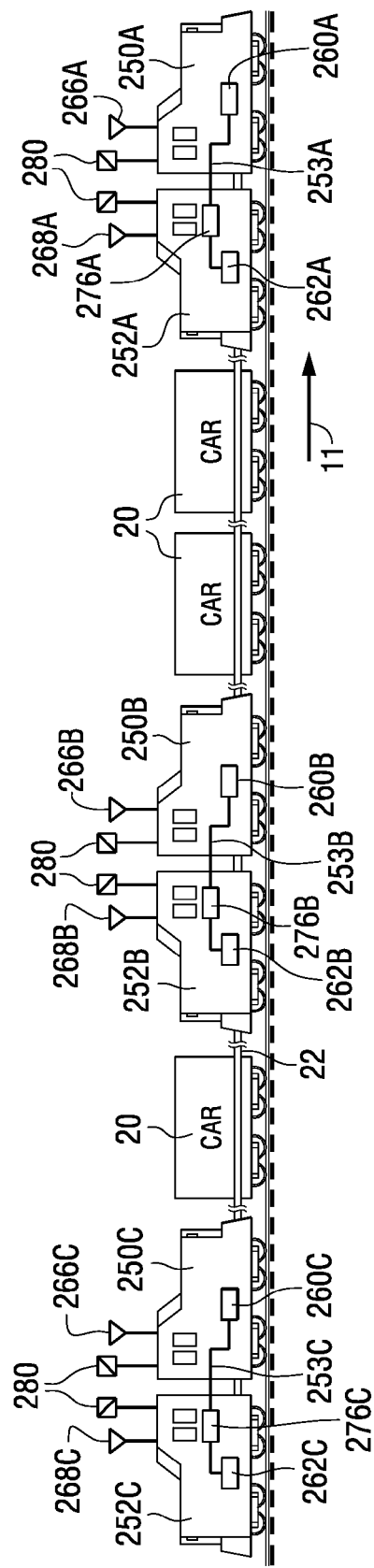
FIG. 10 is a schematic illustration of a distributed power train according to another embodiment of the present inventive subject matter.

Each consist of two locomotives comprises a forward locomotive 250A/250B/250C and a rearward locomotive 252A/252B/252C (see FIG. 10), each locomotive further comprising a forward radio 260A/260B/260C and a rearward radio 262A/262B/262C, each forward radio operative in conjunction with an antenna 266A/266B/266C and each rearward radio operative in conjunction with an antenna 268A/268B/268C, respectively for receiving messages sent from other locomotives of a train 270. The consist locomotives are coupled by an MU (multiple unit) cable 253A/253B/253C. According to conventional railroad parlance, the forward locomotive 250A/250B/250C is designated the "A" unit controlling the locomotive 252A/252B/252C or "B" unit by control signals initiated by the train operator in the "A" unit and supplied to the "B" unit over the MU cable 253A/253B/253C.

It is noted that the concepts described herein also apply to a single locomotive comprising two radios and associated two antennas, one located at each end of the locomotive, with a pantograph or another obstruction located between the two antennas.

When the communications system is activated, the forward radios 260A/260B/260C and the rearward radios 262A/262B/262C in each locomotive consist are activated. Thus both radios in each consist receive messages transmitted by other units in the train 270. Both the forward radios 260A/260B/260C and the rearward radios 262A/262B/262C determine a signal quality metric (such as the signal strength, hit error rate, or the reception of valid data) for each received message. The signal quality metrics are compared in a comparator/processor 276A/276B/276C, and the message having the better signal quality metric is selected as the operative message for use by the locomotives consist.

According to a preferred embodiment, the signal quality metric is determined for all messages received at the forward radios 260A/260B/260C and the rearward radios 262A/262B/262C to select the operative message for that consist. For example, each received radio message can be verified to be correct by subjecting the message to an error detection and correction algorithm, followed by processing according to aspects of the present inventive subject matter to determine the signal quality metric of the signal received at each radio of the consist, from which the operative message for the consist is selected.

Alternatively, in lieu of processing the entire signal for determining the signal quality metric, only a first group of message bits are analyzed to determine the signal quality metric of the message. The message with the better signal quality metric is selected as the operative message for the consist.

Typically, outbound messages are transmitted from the antenna/radio 268A/262A of the lead consist and status messages are transmitted from the antennas/radios 266B/260B and 266C/260C of the remote consists. In yet another embodiment, to minimize interference that can disrupt accurate reception of received signals, one of the antennas 266A/266B/266C (and the corresponding radio 260A/20B/260C) or one of the antenna 268A/268B/268C (and the corresponding radio 262A/262B/262C) is selected as the transmitting antenna in response to a desired direction for the transmitted signal. Note that the antennas 266A/266B/266C are disposed proximate a forward end of the associated locomotive consist (assuming a direction of travel indicated by the arrowhead 11) and the antennas 268A/268B/268C are disposed at a rearward end of the associated locomotive consist.

The radio 260A/260B/260C/262A/262B/262C determines an intended direction for the transmitted signal (e.g., inbound or outbound based on the type of signal and/or information contained in the signal) and selects the transmitting antenna/radio that is closest to the intended receiving antenna/radio. For example, if the locomotive consist comprising the locomotives 250A and 252A is the lead consist and it is desired to transmit an outbound message to the locomotive consist comprising the locomotives 250B and 252B, then the antenna/radio 260A/262A is selected as the operative antenna. This feature can be especially beneficial when each locomotive comprises a pantograph 280 for supplying current to the locomotives from an overhead current source (not shown in FIG. 10). According to this embodiment, an antenna (and corresponding radio) is selected such that the desired signal direction is away from the pantograph. As a further example, if the remote locomotive consist comprising the locomotives 250B and 252B is to send a signal to the locomotive consist comprising the locomotives 250A and 252A, then the antenna/radio 266B/260B is selected as the operative antenna/radio.

Figure 11:
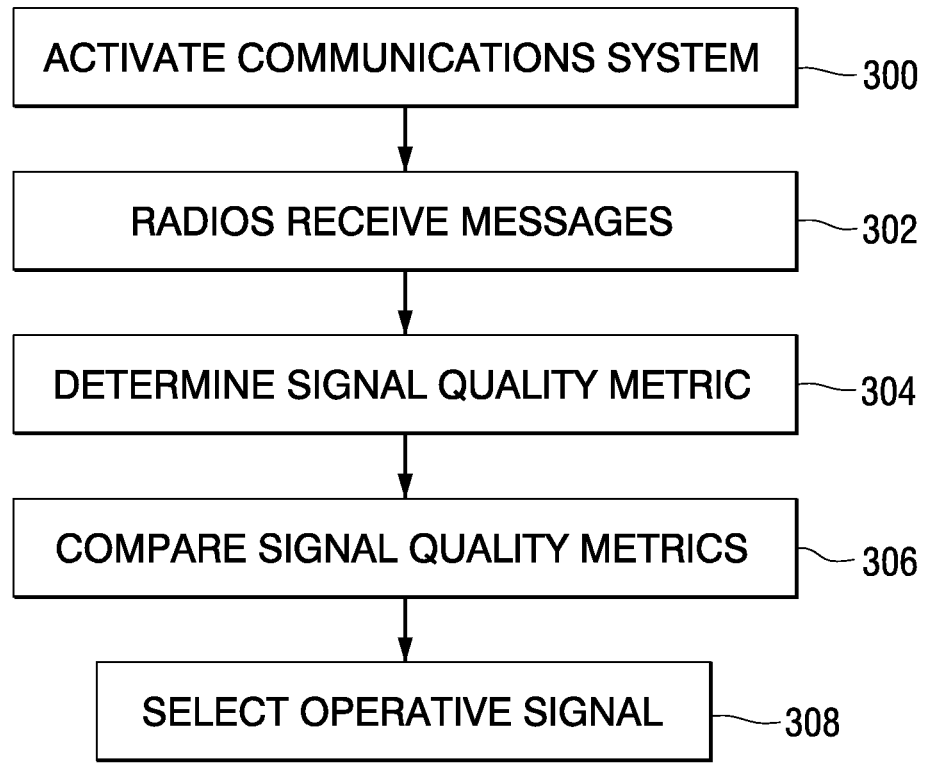
FIGS. 11 and 12 are flowcharts depicting processing steps according to two embodiments of the present inventive subject matter.

FIG. 11 is a flow chart illustrating the method for implementing the signal selection function according to one embodiment of the present inventive subject matter. In one embodiment, the FIG. 11 method is implemented in a microprocessor and associated memory elements within the locomotives of the railroad train, for example, within the locomotives 260A/260B/260C/262A/262B/262C. In such an embodiment the FIG. 11 steps represent a program stored in the memory element and operable in the microprocessor. When implemented in a microprocessor, program code configures the microprocessor to create logical and arithmetic operations to process the flow chart steps. Aspects of the present inventive subject matter may also be embodied in the form of computer program code written in any of the known computer languages containing instructions embodied in tangible media such as floppy diskettes, CD-ROM's, hard drives, DVD's, removable media or any other computer-readable storage medium. When the program code is loaded into and executed by a general purpose or a special purpose computer controlled by a microprocessor, the computer becomes an apparatus for practicing aspects of the inventive subject matter. Aspects of the present inventive subject matter can also be embodied in the form of a computer program code, for example, whether stored in a storage medium loaded into and/or executed by a computer or transmitted over a transmission medium, such as over electrical wiring or cabling, through fiber optics, or via electro-magnetic radiation, wherein when the computer program code is loaded into and executed by a computer, the computer becomes an apparatus for practicing the inventive subject matter.

The FIG. 11 flow chart begins at a step 300 where the communications system is activated, thus the forward radios (260A/260B/260C in FIG. 10) and the rearward radios (262A/262B/262C in FIG. 10) in each locomotive consist are activated. As indicated at a step 302, both radios in each consist receive messages transmitted by other units in the train 270. As indicated at a step 304, both the forward radios and the rearward radios determine a signal quality metric (such as the signal strength, bit error rate, or the reception of valid data) for each received message. The signal quality metrics are compared at a step 306 and the message having the better signal quality metric is selected (see a step 310) as the operative message for use by the locomotive consist.

Figure 12:
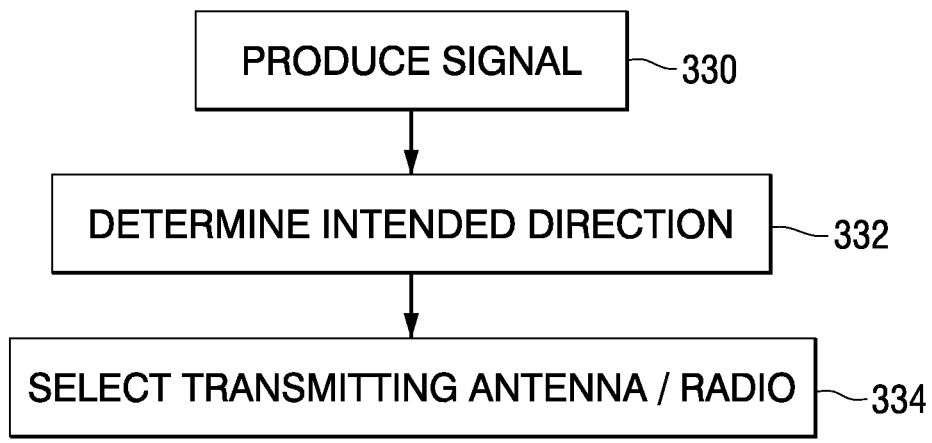

A flowchart of FIG. 12 depicts the antenna/radio diversity feature of one embodiment of the present inventive subject matter. At a step 330 a signal is produced for transmitting to another locomotive in the train. At a step 332 an intended direction for the transmitted signal (e.g., inbound or outbound based on the type of signal and/or information contained of the signal) is determined. At a step 334, the transmitting antenna/radio is selected as the antenna/radio that is closest to the intended receiving antenna/radio.

Certain embodiments herein have been described with respect to railroad trains. Any of such embodiments, unless otherwise specified (such as in the claims), are also applicable to rail vehicle consists or other vehicle consists more generally, a "vehicle consist" referring to a group of linked vehicles that travel together along a route. For example, a "rail vehicle consist" is a group of linked vehicles that travel together along a set of rails or other guideway. As another example, a "marine vehicle consist" is a group of marine vessels linked together to travel along a waterway. Additionally, other embodiments herein have been described with respect to locomotives. Any of such embodiments, unless otherwise specified such as in the claims), are also applicable to powered rail vehicles or other powered vehicles more generally. A "powered vehicle" is a vehicle (marine, on-road, off-road, etc.) capable of self-propulsion. A "powered rail vehicle" is a vehicle configured for self-propulsion along a pair of rails or other guideway.

While the aspects of the inventive subject matter have been described with reference to preferred embodiments, it will be understood by one of ordinary skill in the art that various changes may be made and equivalent elements may be substituted for elements thereof without departing from the scope of the present inventive subject matter. The scope of the present inventive subject matter further includes any combination of the elements from the various embodiments set forth herein. In addition, modifications may be made to adapt a particular situation to the teachings of the present inventive subject matter without departing from its essential scope. Therefore, it is intended that the inventive subject matter not be limited to the particular embodiment disclosed as the best mode contemplated for carrying out aspects of the present inventive subject matter, but that the inventive subject matter will include all embodiments falling within the scope of the appended claims.

What is claimed is:

1. A system comprising:
a first transceiver associated with a first antenna of a first powered vehicle in a vehicle consist having at least a second powered vehicle, the first transceiver configured to transmit an outbound message over a communication channel for receiving by the second powered vehicle, the first transceiver and the first antenna further configured to receive an inbound message transmitted by the second powered vehicle over the communication channel, the inbound message comprising a plurality of message bytes;
a second transceiver associated with a second antenna that is spaced apart from the first antenna, the second antenna configured to transmit an outbound message over the communication channel for receiving by the second powered vehicle, the second transceiver and the second antenna further configured to receive the inbound message transmitted by the second powered vehicle over the communication channel; and
at least one processor configured to:
determine correct bytes and error bytes in the inbound message as received by the first transceiver;
determine correct bytes and error bytes in the inbound message as received by the second transceiver; and
assemble a reconstructed message using correct bytes from at least one of the inbound message received at the first transceiver or the inbound message received at the second transceiver.

2. The system of claim 1, wherein the correct bytes in the inbound message represent bytes in the inbound message other than the error bytes.

3. The system of claim 1, wherein the inbound message comprises a data portion and an error detection portion.

4. The system of claim 3, wherein the error detection portion of the inbound message comprises a parity check portion.

5. The system of claim 1, wherein the processor is further configured to assemble a reconstructed message using the correct bytes of the inbound message by replacing a first error byte in at least one of the inbound message received at the first transceiver or the inbound message received at the second transceiver with a corresponding first correct byte from the inbound message received at the other of the first transceiver or the second transceiver.

6. A tangible and non-transitory computer readable storage medium for a system that includes a processor, the computer readable storage medium including one or more sets of instructions configured to direct the processor to:
transmit an outbound message from a first transceiver via a first antenna or from a second transceiver via a second antenna, the outbound message comprising a plurality of message bytes;
after an inbound message has been received at the first and the second antennas and the associated first and second transceivers, determine correct bytes and error bytes in the inbound message as received at the first transceiver and determining correct bytes and error bytes in the inbound message as received at the second transceiver; and
assemble a reconstructed message using correct bytes from at least one of the inbound message as received at the first transceiver or the inbound message as received at the second transceiver.

7. The computer readable storage medium of claim 6, wherein the correct bytes in the inbound message represent bytes in the inbound message other than the error bytes.

8. The computer readable storage medium of claim 6, wherein the plurality of message bytes of the inbound message comprises a data portion and an error detection portion.

9. The computer readable storage medium of claim 7, wherein the error detection portion comprises a parity check portion.

10. The computer readable storage medium of claim 6, wherein the one or more sets of instructions are further configured to direct the processor to assemble the reconstructed message by replacing a first error byte in at least one of the inbound message received at the first transceiver or the inbound message received at the second transceiver with a corresponding correct byte from the other of the inbound message received at the first transceiver or the inbound message received at the second transceiver.

11. A tangible and non-transitory computer readable storage medium for a system that includes a processor, the computer readable storage medium including one or more sets of instructions configured to direct the processor to:
transmit an outbound message from a lead powered vehicle, the outbound message comprising a first plurality of message bytes, the outbound message configured to be received by one or more of a plurality of remote powered vehicles receiving and retransmitting the outbound message;
after a first occurrence and a second occurrence of the outbound message being received at one or more of the plurality of remote powered vehicles, determine correct bytes and error bytes in the first occurrence of the outbound message and determine correct bytes and error bytes in the second occurrence of the outbound message; and
assemble a reconstructed outbound message at the one or more of the plurality of remote powered vehicles using the correct bytes from at least one of the first or the second occurrences of the outbound message.

12. The computer readable storage medium of claim 11, wherein the first plurality of message bytes of the outbound message comprises a data portion and an error detection portion.

13. The computer readable storage medium of claim 12, wherein the error detection portion comprises a parity check portion.

14. The computer readable storage medium of claim 11, wherein the one or more sets of instructions are further configured to direct the processor to assemble the reconstructed message by replacing a first error byte in one or more of the first and the second occurrence of the outbound message with a corresponding correct byte from the other of the first or the second occurrence of the outbound message.

15. The computer readable storage medium of claim 11, wherein the one or more sets of instructions are further configured to direct the processor to:
transmit an inbound message from a first remote powered vehicle of the plurality of remote powered vehicles, the inbound message comprising a second plurality of message bytes, wherein the inbound message is configured to be received by a second remote powered vehicle of the plurality of remote powered vehicles that receives and retransmits the inbound message;
after receiving a first occurrence and a second occurrence of the inbound message at one or more of the plurality of remote powered vehicles or at the lead powered vehicle, determine correct bytes and error bytes in the first occurrence of the inbound message and determine correct bytes and error bytes in the second occurrence of the inbound message; and assemble a reconstructed inbound message at the first remote powered vehicle or at the lead powered vehicle using correct bytes from the first or the second occurrence of the outbound message.

16. The computer readable storage medium of claim 15, wherein the second plurality of message bytes comprises a data portion and an error detection portion.

17. The computer readable storage medium of claim 16, wherein the error detection portion comprises a parity check portion.

* * * * *

UNITED STATES PATENT AND TRADEMARK OFFICE
CERTIFICATE OF CORRECTION

| | | |
|---|---|---|
| PATENT NO. | : 8,626,058 B2 | Page 1 of 1 |
| APPLICATION NO. | : 13/529724 | |
| DATED | : January 7, 2014 | |
| INVENTOR(S) | : Smith, Jr. et al. | |

It is certified that error appears in the above-identified patent and that said Letters Patent is hereby corrected as shown below:

In the Specification:

In Column 2, Line 62, delete "distributed" and insert -- On distributed --, therefor.

In Column 4, Line 15, delete "provided," and insert -- provided --, therefor.

In Column 9, Line 35, delete "(OBMAR)" and insert -- OBMR --, therefor.

In Column 10, Line 59, delete "inbound," and insert -- inbound --, therefor.

In Column 15, Line 35, delete "260A/262A" and insert -- 268A/262A --, therefor.

In Column 16, Line 45, delete "such as in" and insert -- (such as in --, therefor.

Signed and Sealed this
Tenth Day of June, 2014

Michelle K. Lee
*Deputy Director of the United States Patent and Trademark Office*